Jan. 20, 1959 F. G. HALLDEN ET AL 2,870,246

TWO WAY FACSIMILE REPEATER

Filed Jan. 29, 1954 4 Sheets-Sheet 1

INVENTORS
F. G. HALLDEN
M. J. McCANN
BY
ATTORNEY

Jan. 20, 1959 F. G. HALLDEN ET AL 2,870,246

TWO WAY FACSIMILE REPEATER

Filed Jan. 29, 1954 4 Sheets-Sheet 2

INVENTORS
F. G. HALLDEN
M. J. McCANN

BY

[signature]

ATTORNEY

Jan. 20, 1959 F. G. HALLDEN ET AL 2,870,246
TWO WAY FACSIMILE REPEATER
Filed Jan. 29, 1954 4 Sheets-Sheet 3

*INVENTORS*
F. G. HALLDEN
M. J. McCANN
*BY*
[signature]
ATTORNEY

Jan. 20, 1959 F. G. HALLDEN ET AL 2,870,246

TWO WAY FACSIMILE REPEATER

Filed Jan. 29, 1954 4 Sheets-Sheet 4

*INVENTORS*
F. G. HALLDEN
*BY* M. J. McCANN

M. J. Reynolds
ATTORNEY

United States Patent Office 2,870,246
Patented Jan. 20, 1959

2,870,246

TWO WAY FACSIMILE REPEATER

Frederick G. Hallden, Bellerose, N. Y., and Marshall J. McCann, Long Beach, Calif., assignors to The Western Union Telegraph Company, New York, N. Y., a corporation of New York Application January 29, 1954, Serial No. 406,963

7 Claims. (Cl. 178—5)

This invention relates to the art of facsimile telegraphic communication and more particularly to repeater devices in a facsimile system for two-way message transmission, when the message signals used include both an A. C. message component and a D. C. control signal component.

Such a system is described in U. S. Patent No. 2,606,-963, issued August 12, 1952, to Garvice H. Ridings et al., and to which reference is made in regard to specific details of circuitry and operation not here described.

A system to which the apparatus particularly described herein is applicable comprises a central office station in which are located the line jack terminations of a number of subscribers' lines, at least one facsimile transmitter, and at least one facsimile receiver. These facsimile machines are equipped with flexible cord and plug connections so that they may be connected to any desired one of the subscribers' lines. Two-wire lines having provision for the independent transmission of D. C. control signals over a simplex circuit associated with each line lead from the central office to each subscriber. The subscriber is provided with facsimile equipment in the form of a transmitter-receiver here called a transceiver which is equipped with a buzzer, control switch buttons and signal lamps, and which is permanently connected to the aforementioned two-wire line, to ground, and to a local supply of A. C. power which, with exceptions later to be explained, is a part of the same synchronized power network as is that supplying the central office.

The general operation of the equipment is as follows:

The normal negative potential supplied to the line by the central office is grounded by closing a switch in the subscriber's transceiver when the subscriber desires to initiate a call to the central office. The resulting flow of line current causes an indicator lamp above the subscriber's line jack in the central office to glow, and the operator inserts a plug connected to her receiver into the jack. When the subscriber's switch was closed, his transceiver was also energized, resulting, after a brief delay, in periodic short interruptions being made in the line current by a pair of phasing contacts actuated by a cam on the transceiver drum. By means of these interruptions, the central office receiver is clutch-released to start in correct phase relation to the transceiver, and normal negative potential is then removed from the line automatically and positive potential applied. A relay in the subscriber's transceiver which is polarized by means of a dry disc rectifier, operates in response to this change of polarity to initiate scanning accompanied by transmission of the facsimile message signals over the line pair. Since the central office receiver is now running in synchronism and in phase, the message is properly recorded at the central office. When the transceiver carriage reaches the end of its travel, the starting switch is opened, deenergizing the transceiver. Relay means at the central office detect this cessation of pulses and an indicator lamp is operated for manual restoration of normal negative potential to the line, by removal of the receiver plug from the line jack. The line is not conductive to negative current because of a rectifier connected in an opposing direction at the transceiver.

For transmission from the central office to the subscriber's transceiver, the central office transmitter is plugged into the jack of the subscriber's line. Normal negative line potential is then removed from the line and positive potential applied, which causes a buzzer to sound in the subscriber's transceiver. The subscriber thereupon wraps a message blank around the scanner drum and energizes his transceiver which then transmits pulse interruptions to phase the transmitter in the manner previously described for the reverse direction of transmission, after which the transmitter sends the message until completed, stops, and reverses the polarity of the potential applied to the line from positive to negative. This again causes a buzzer to sound in the transceiver, and the subscriber presses a switch button to stop the transceiver and silence the buzzer, removes and examines the message, and presses an acknowledgment switch button on the transceiver which interrupts the simplex current flowing to ground and causes an operator's central office lamp to glow. This is a signal for the operator to take down the connection to the subscriber's line, and in doing so, normal negative potential is reapplied to the simplex circuit of the now-ungrounded line.

It will be obvious from the above description that the direct current conditions prevailing on the facsimile circuit constitute an important feature in the method of control employed, and it is with the preservation and transmission of such control signals through an interposed repeater that the present invention primarily is concerned.

The transmission of facsimile signals over wire lines is accompanied by unavoidable attenuation, and by degradation of the signals due to losses in the lines, unfavorable electrical characteristics of the lines, and the introduction of spurious noise signals picked up by the lines from their environment. Amplification of the received signals is employed in order to provide sufficient magnitude for the operation of the recorder, and especially in cases where a dry electrographic paper is used, such amplification is desirable to produce the relatively high recording voltage needed. Such amplification, however, has the disadvantage of also amplifying any noise picked up as previously mentioned, and therefore results in the production of visible flaws in the recorded copy if the final noise voltage resulting from the operation of the amplifier is excessive in amount.

When relatively long lines must be used between facsimile transmitter and receiver, exceeding in a typical instance an attenuation of 25 decibels, the signals are diminished by attenuation as before described, and may become comparable in magnitude to the noise voltage. When this has occurred, it is no longer feasible to amplify the signal to a usable recording level without also amplifying therewith an amount of noise too great to permit satisfactory recording.

This situation can be avoided by maintaining a safe margin between the facsimile signal level and the noise level at all times through the use of repeaters introduced into the line for amplifying the signal before it recedes below a specified safe margin.

Repeaters formerly have been applied to telegraph lines for transmission in one direction, and to telephone lines for transmission in two directions. In the latter instance it is necessary to provide some appropriate arrangement for the accommodation of two-way traffic. Two repeaters can be operated independently on the same line in opposite directions by means of a pair of hybrid coils so that conversations in either direction are amplified. This necessitates the use of a carefully balanced artificial line with which to terminate each coil, however, and is prone to maladjustment and consequent singing of the line due to the cyclic regeneration of reflections from the imperfect impedance match resulting from such maladjustment. For this reason the gain available from such a repeater is severely limited. Any transmission of direct current control signals is accomplished by means of a simplex circuit shunted around the repeater, that is, by a connection between the center tap of the input winding of the input transformer and the center tap of the output winding of the output transformer, thus producing a conductive circuit for direct current through the two line wires in parallel when completed by an earth return. It is clear that this type of simplex circuit, while it successfully provides for the transmission of control currents around the repeater, is not capable of amplifying them, or of regenerating their original shape when the impulses received are distorted in shape and it is also apparent that an additional amount of resistance is introduced into the simplex circuit cumulatively at each such repeater because of the extra transformer coils employed. In the present facsimile system, as already noted, distinctive control signals are provided for the purpose of handling specific facsimile terminal functions. Since these control signals are directional in nature they may be used for establishing direction of repeating for intermediate amplifiers. These control signals may assume a variety of forms but as described they comprise D. C. signals transmitted over the simplex leg of the message circuit. They may, therefore, be readily separated from the message signals at the repeaters and directed to the appropriate directional control devices.

In general, control signals of this character do not attenuate as rapidly as do the message signals; however, in long circuits it may become necessary to repeat or regenerate the control signals as well as the message signals. Hence, a repeatered facsimile circuit according to the present invention, may consist of one or more one way facsimile message signal repeaters whose direction of repeating is determined by the regular facsimile control function signals, these latter signals being bypassed without regeneration, and other similar repeaters paralleled, as required, by two-way repeaters for the control signals. Amplification and regeneration are not required with the same frequency when transmitting control signals as in other kinds of transmission, but in long distance lines at least a proportion of the repeaters must have associated with them means for reenforcing these control function signals. Since the control signals perform a variety of functions at the terminals, novel arrangements are necessary at the repeaters to render the repeaters unresponsive to any signals other than those which determine the direction of transmission.

It is accordingly one of the objects of the present invention to provide an amplifying repeater for facsimile intelligence signals capable of transmitting in either direction upon command from a remote location, and which will bypass control signals without amplification.

It is a further object of this invention to provide such a repeater without recourse to the use of artificial lines.

Another object of the invention is to provide a stable repeater for facsimile intelligence signals capable of transmitting in either direction upon remote command, and which regenerates direct current control signals.

Another object of the present invention is to provide a system of facsimile transmission whereby intelligence signals and control signals are amplified in their transmission by a group of repeaters, which uses a minimum number of control signal amplifying repeaters.

It is another object of this invention to provide equipment to utilize the function signals normally provided for facsimile transmitter-receiver control for controlling also the direction of transmission of intermediate repeaters.

A further object is to render intermediate facsimile signal repeaters selectively responsive to a directional feature of incoming function signals and to that feature only.

Additional objects of the invention will be evident from a consideration of a detailed description thereof, taken in conjunction with the drawings, in which.

Figure 1:
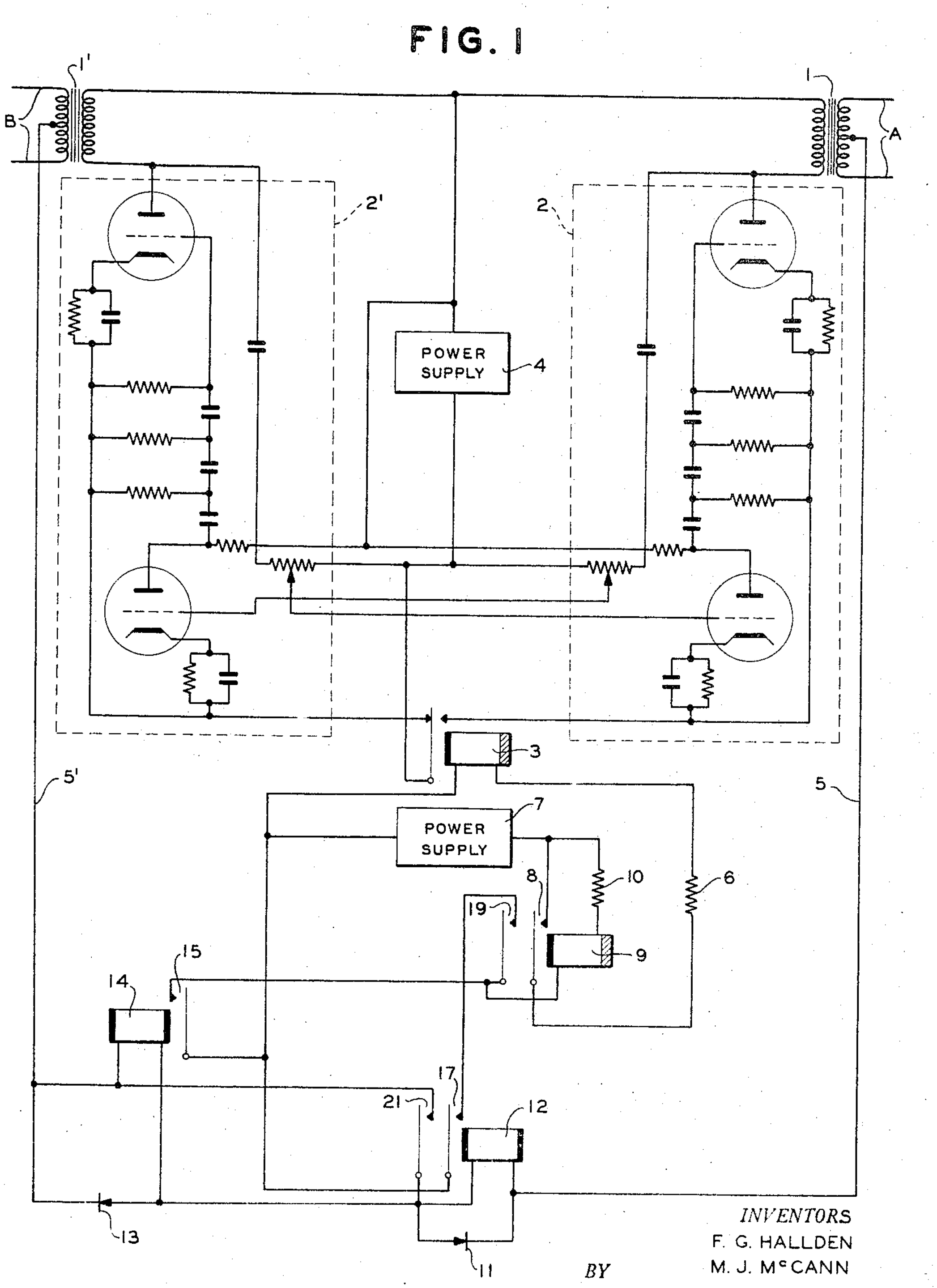
Fig. 1 is a circuit diagram of a two-way facsimile repeater controlled as to direction by D. C. signals.

Referring now to Fig. 1, letters A and B denote incoming and outgoing pairs, respectively, of a wire line carrying facsimile intelligence signals together with direct current control signals, as later explained. By the term "incoming" is meant connected to the instant apparatus and directed toward a central office, while by "outgoing" is meant connected to the instant apparatus and directed toward a transceiver such, for example, as would be located on the premises of a distant subscriber. It is one of the features of this invention, however, that its operation is bilateral in respect to both facsimile signals and to direct current control signals, so that such signals may enter the apparatus from either of the said lines while leaving by the other.

Transformers 1 and 1' pass the facsimile signals upon their arrival, into the amplifier 2 or 2' respectively, the selective energization of which is determined by the position of relay 3 which is responsive to the desired direction of transmission as determined from the prevailing direct current condition of the lines A, B. Amplifier 2' is energized in the unoperated condition of relay 3 and amplifier 2 is energized in the operated condition of this relay. A direct potential is applied at the central office simultaneously to both wires of line pair A, so that the withdrawal of a current by means of the wires 5, 5' and ground at the subscriber's line B, or any changes of such potential as may occur in the said circuit will not interfere with the facsimile signals being transmitted over the pair and through the repeater. A conventional power supply 4 is employed to energize the amplifiers 2 and 2' with the necessary direct potential and to supply alternating heater current to the vacuum tubes thereof, which latter arrangement is well known and is omitted from the drawings for the sake of clarity.

Figure 6:
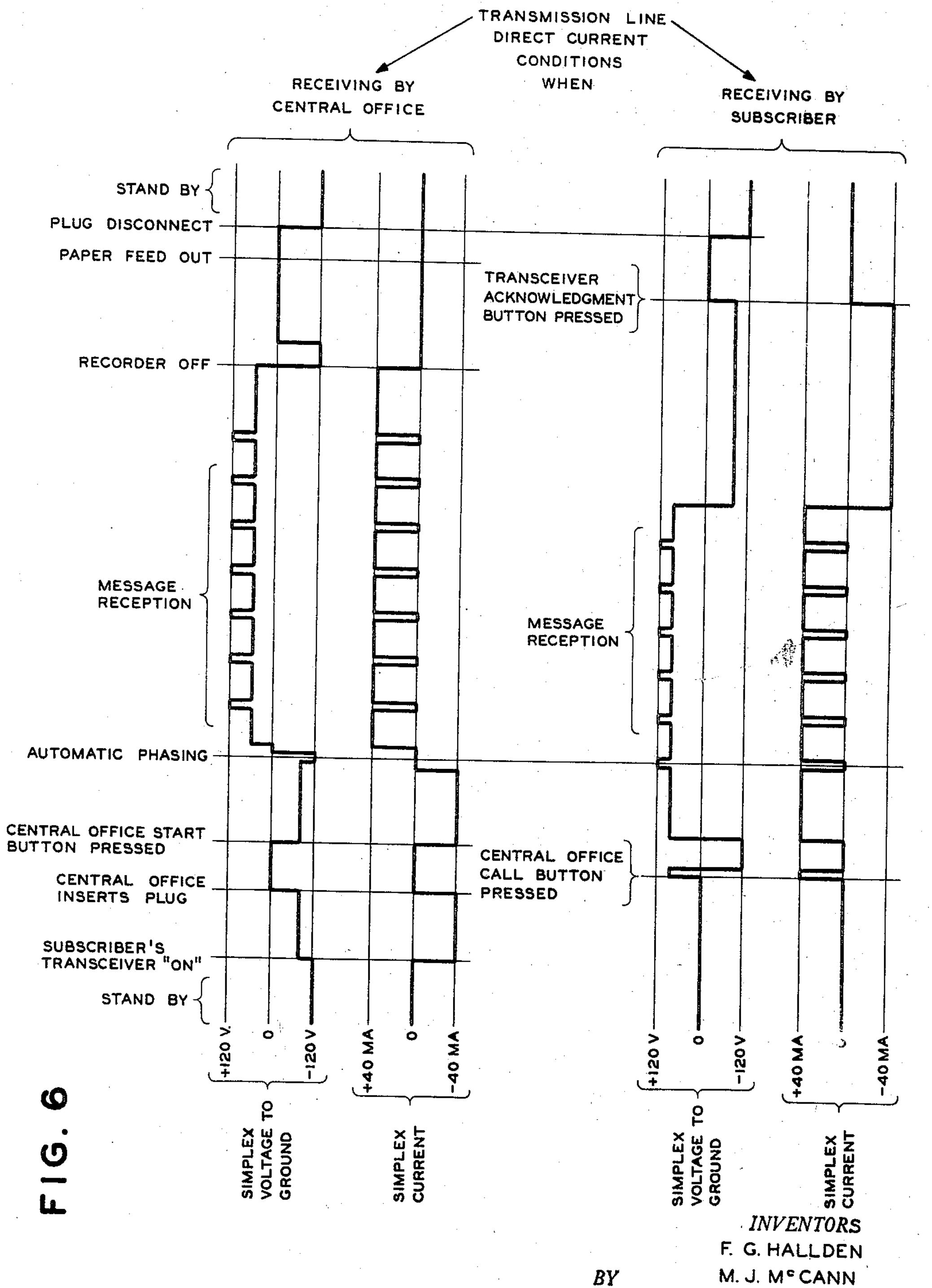
Fig. 6 is a diagrammatic representation of electrical conditions occurring on the transmission line.

Now, it is to be noted that in the illustrative example herein described, facsimile transmission is established through the aid of the present invention between two facsimile machines of a type widely employed in the art, which operate as follows:

As stated in the system of the aforesaid patent, the central office normally supplies a continuous negative battery potential to the two-wire connecting line A through a simplex circuit having a normally open ground return path. A graphic representation of this, as well as later mentioned potentials and currents in the transmission line which accompany the operation of the system is provided in Fig. 6. A call from the subscriber's transceiver over line B is initiated by completing the aforementioned simplex circuit to ground. A signal at the central office is operated by the consequent flow of current, in response to which the central office operator connects the line to a suitable receiver. Closing of the subscriber's switch also energizes his transceiver from a local power source, and after a suitable delay to permit adequate heating of vacuum tubes, a relay therein operates to cause the transmisison of periodic 22 millisecond interruptions in the current of the simplex circuit. These interruptions operate at the central office to correctly phase the receiver for reception, and when this is completed, the central office reverses the potential applied to the simplex circuit from negative to positive, and this reversal of potential initiates transmission of the message by starting the subscriber's carriage feed motor. When transmission is completed, the subscriber's starting switch is automatically released, interrupting the transmission of the 22 millisecond phasing pulses. A central office indicator detects the cessation of phasing pulses whereupon the operator manually restores the normal negative line potential by removal of the receiver plug from the line jack.

When transmission is desired from the central office to the subscriber's transceiver, a plug connected to a central office transmitter is inserted in the jack which terminates the subscriber's line, thereby removing the normal negative potential from the line. Positive potential is applied to the line at the central office which signals the subscriber. The subscriber responds by starting his transceiver which, after a short delay for tube warmup, transmits phasing pulses in the manner previously described. This causes the central office transmitter to start in correct phase relation with the subscriber's transceiver, and to transmit the message. When scanning of the message at the transmitter is completed, negative potential is reapplied to the line. This change of line polarity causes a buzzer to sound in the transceiver of the subscriber, who thereupon pushes an acknowledgment switch button causing a removal of potential from the line. The consequent interruption of current is a signal to the central office operator to remove the transmitter plug from the line jack, thereby restoring the normal negative standby potential to the line.

In Fig. 1, then, the relay 3 is of the slow-to-release type, being provided with a slug of conductive material for that purpose, and is operated through a current limiting resistor 6 by a second power supply 7 when a pair of normally open contacts 8 of the slow-to-release relay 9 are closed upon energization of said relay 9 through the current limiting resistor 10. Such energization can be initiated only by a flow of direct current through the simplex circuit from negative battery on line A to ground on line B. Flow of current in such direction is caused by a grounding of the remote end of line B when the circuit is carrying the quiescent negative potential, and constitutes the function signal of the subscriber's transceiver initiating the transmission cycle. Such a current is bypassed by the dry disc rectifier 11 around the relay 12, and therefore does not affect it. Rectifier 13, however, presents high resistance to a flow of current in this direction, and current is therefore forced to flow through the coil of relay 14, closing its contacts 15 to energize relay 9 thus energizing relay 3 as previously described, and placing amplifier 2 in operative condition for transmitting facsimile signals in the direction B to A.

Operation of the transceiver produces short interruptions in this current to phase the central office recorder. When phasing is effected, the D. C. line potential is switched from negative to positive and transmission of the facsimile message begins.

The transmission of such facsimile signals from the subscriber's station in the direction B to A is accompanied by the transmission of the aforesaid current from positive battery polarity in the simplex circuit. This current is interrupted periodically at the subscriber's station to produce blanking signals. The abrupt reversal of current flow due to the change from negative to positive battery potential applied to the line at the central office is bridged by the sluggish release of relay 9, so that relay 12 in response to this positive current pulls in, to close contacts 17 and hold in the relay 9 before the series locking contacts 19 have time to fall open.

Relay 9 also holds in through the short blanking interruptions and thus maintains the amplifier 2′ energized throughout transmission from the subscriber's station and until released by a long interruption in the positive current flow through relay 12 produced automatically at the end of such transmission. Release of the relay 9 opens its contacts 8 to release relay 3 and thus energize the amplifier 2.

When transmission is desired in the direction A to B, normal quiescent negative potential is removed from the simplex circuit at the central office and a positive potential is applied thereat to indicate at the subscriber's station that transmission to the subscriber is desired. The consequent flow of positive current energizes relay 12, closing its contacts 17, but since series contacts 19 of relay 9 are open at this time (relay 14 not having been energized because bypassed by the rectifier 13) no further action results and amplifier 2′ remains energized. Succeeding positive line current flow having phasing and blanking interruptions is likewise incapable of operating the relay 3, and it remains deenergized, thus completing the signal circuit through amplifier 2′ as required for transmission in the direction A to B.

Rectifier 11 shunted across the coil of relay 12 makes it slow to release, which is desirable for its purposes. Since such action is not required of relay 14, however, it is shunted by contacts 21 of relay 2 to prevent this effect.

Figure 2:
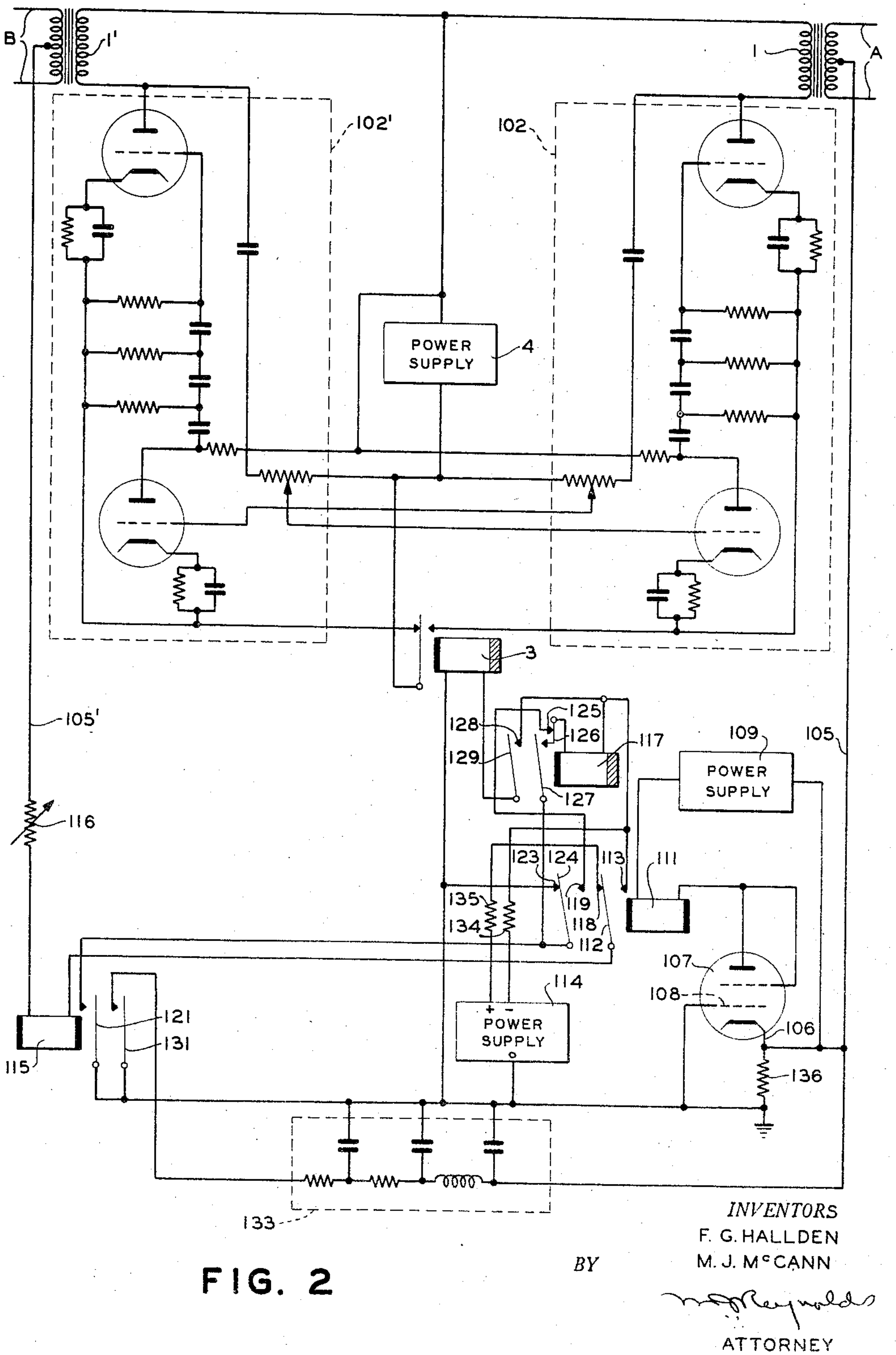
Fig. 2 is a circuit diagram of a two-way facsimile repeater which also regenerates the control signals.

In Fig. 2 is shown another form of repeater circuit whereby facsimile signals are amplified by amplifier 102 or 102′ according to the desired direction of transmission determined from direct current function signals present in the lines A and B, as in Fig. 1 previously described, but having in addition thereto components and circuitry adapted to regenerate the said function signals at the repeater, and transmit them therefrom with renewed intensity.

Amplifiers 102 and 102′, together with power supply 4 and relay 3 operate through transformers 1 and 1′ in the manner described.

Normal prevailing negative potential with respect to ground on the simplex circuit wire 105 of the quiescent line A from the central office holds cathode 106 of triode connected vacuum tube 107 (conveniently a type 6AQ5 tube) negative in respect to its grounded grid 108. Tube 107 therefore conducts current from its power supply 109 through a plate circuit relay 111 to attract movable contact 112 into engagement with contact 113, thus applying negative voltage from power supply 114 through current limiting resistor 134 and through the coil of relay 115 and adjusting rheostat 116 to the outgoing wire 105′ of the simplex circuit and the line B to the subscriber's station. No current flows in the wire 105′ under this condition since line B is normally ungrounded and relay 115 remains deenergized. Relay 117, which controls the operation of amplifier switching relay 3 is also unoperated at this time and thus amplifier 2′ is energized through the back contact of relay 3 for transmission in the direction A to B.

This condition represents the quiescent or standby state of the transmission system.

When transmission from the central office to the subscriber's station is desired, the application at the central office of positive potential to the line A causes cathode 106 to assume a more positive potential than grounded grid 108, which therefore causes tube 107 to cut off, releasing relay 111 which is in series with the plate circuit of tube 107, to send positive voltage from power supply 114 through back contact 118 and armature 112 of the said relay into the coil of relay 115, the rheostat 116, and the wire 105′ of the simplex circuit, and the line B, thus repeating on the line B the positive potential imposed in the line A by the central office operator. While line B is normally ungrounded to negative battery, it is normally grounded to positive potential through a rectifier arrangement. Consequently a flow of positive current at the subscriber's end of line B, preparatory to message reception, causes relay 115 to pull in, but because contacts 119 and 113 of relay 111 are open, no further action results and the amplifier 102' which is operative in the desired direction remains energized by the back contact of relay 3. Application of a momentary negative test potential to the line at the central office does not alter this result since relay 115 then drops out due to lack of current flow in the line, and it is only when relays 111 and 115 are simultaneously in the closed position that relay 117 is energized to reverse the direction of the repeater. It is thus possible to test at the central office the conductivity of the line to negative battery potential immediately prior to a transmission in order to ensure that the subscriber has not himself indicated a desire to transmit by grounding the line with his "transmit" button switch after the connection has been made up at the central office.

If, on the other hand, it is desired to transmit from the machine of a remote subscriber connected to line B, into the central office connected to line A, the negative quiescent potential of the simplex circuit supplied from the central office and relayed to the subscriber's equipment by the instant apparatus as previously described, is grounded at the subscriber's equipment. The consequent flow of current from the negative terminal of the power supply 114 through contacts 112 and 113 of operated relay 111 causes relay 115 to close its contacts 121 applying ground to contact 119 of relay 111 through its movable contact 124 and thence to the winding of relay 117 through its make-before-break contact 125, the circuit being completed through the current limiting resistor 134 and the negative terminal of power supply 114. Relay 117 is thus energized, attracting its movable contact 127 into engagement with contact 126. This action breaks the connection between contacts 125 and 126, but locking ground is continued over contacts 126 and 127 so that relay 117 remains energized. Even in the absence of current flow in line B, as described, locking ground for maintaining the directional setup remains available to relay 117 over the contact 123 and tongue 124 of relay 111, provided the line potential of line 105 remains positive. An additional pair of contacts 128 on relay 117 close to energize relay 3 for transmission in the direction B to A, as is required.

Resistors 134 and 135 serve to limit the flow of current through relays 115 and 117, while resistor 136 provides cathode bias for vacuum tube 107.

It is to be observed that at such times as relay 115 is energized due to a flow of current in the wire 105', its contacts 131 close to apply ground through the conventional shaping network 113 to the wire 105, thus repeating the condition of line B, including such current flow, into the line A.

The operation of the circuit as above described is such as to close the relay 117 only if the relay 111 is energized by a negative potential on the line A at the same time that current flow in the line B causes relay 115 to operate. Once energized, however, relay 117 will hold in irrespective of the condition of relay 111 provided there is a flow of current in the line B, or will hold in even if no current flows in line B provided relay 111 is deenergized by the line A being positive. Relay 117 is of the slow-to-release type so that momentary interruptions in the line continuity, as required for blanking and phasing purposes, will not influence its operation or cause it to lose control of the relay 3.

In constructing a transmission system for intercommunication by means of facsimile transmitters and receivers, it is found that while the attenuation of the control signals through a single repeater section may not be serious and can be tolerated, nevertheless when more than one such repeater of the type of Fig. 1 is connected in tandem in the line excessive degradation of the control signals can result. The use of repeaters of the type of Fig. 2 does not entail this degradation of the control signals, but the construction of this type of repeater is more expensive than is that of Fig. 1. It is found that by arranging the repeaters as shown in Fig. 3, satisfactory performance of the system can be obtained without excessive total cost or complexity in the repeater chain.

The principle involved is that of using alternate repeaters of the type of Fig. 1 and of the type of Fig. 2 and where the total number of repeaters required is an odd number, of using a number of repeaters of the type of Fig. 2 one less than those of the type of Fig. 1.

By so constructing the repeater chain, the cost and complexity of the assembly, as well as its liability to failure due to the deterioration of its components is materially reduced, resulting in greater reliability of operation without sacrifice of performance.

Figure 5:
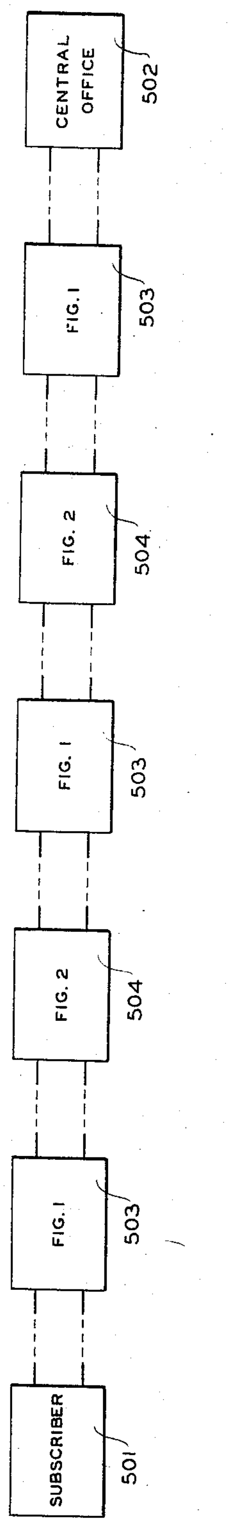
Fig. 5 is a diagram showing the apparatus of Figs. 1 and 2 arranged according to the present invention.
Figure 3:
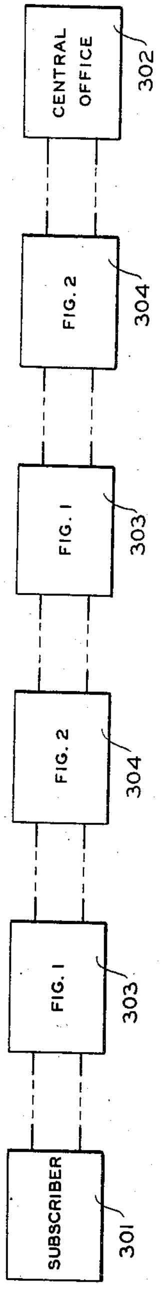
Fig. 3 is a diagram showing the apparatus of Figs. 1 and 2 advantageously employed in a circuit for the transmission of facsimile signals over relatively long distances.
Figure 4:
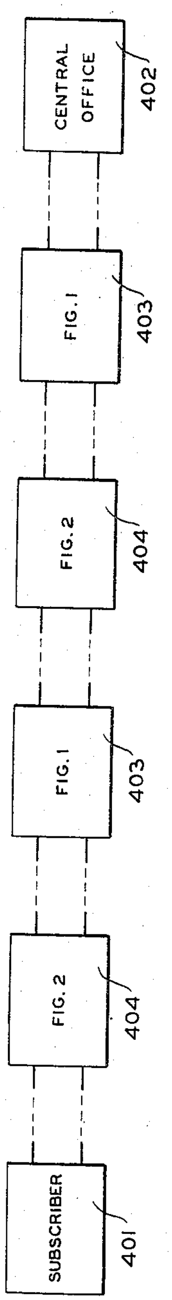
Fig. 4 is a diagram showing the apparatus of Fig. 3 differently arranged for similar purposes under other conditions of use.

It has been determined that the order of alternation of the repeaters in the repeater chain is of no consequence when the total number of repeaters is an even number, that is to say, the arrangement represented by Fig. 3, where numeral 301 denotes the subscriber's transceiver, numeral 302 the central office transmitting and receiving equipment, 303 the repeater of Fig. 1 and 304 the repeater of Fig. 2 is the equivalent of the arrangement shown in Fig. 4, wherein 401, etc., represent the same elements designated 301, etc., in Fig. 3. When the total number of repeaters required is odd, however, it is necessary for the sake of economy that the repeater proximate to each terminus be of the type of Fig. 1, and that each successive repeater on the line be of different type, i. e., that the first repeater being of the type of Fig. 1, the second be of the type of Fig. 2, the third of the type of Fig. 1, etc., as shown, for example in Fig. 5, wherein 501, etc. represent the same elements designated by 301, etc., respectively in Fig. 3.

It is to be noted that the kinds of facsimile transmission systems with which the present invention is adapted to be employed are not limited to direct current signals on a simplex circuit but may also include signals on a composite circuit or direct or alternating signals on any suitable kind of transmission channel.

Although the present invention has been described in terms of specific illustrative examples thereof, it is obvious that various enlargements, modifications and alterations can be made therein without departing from the essential inventive concept embodied therein, and it is therefore intended that the invention be subject only to the limitations specifically set forth in the appended claims.

What is claimed is:

1. A bi-directional non-simultaneous transmission line repeater for facsimile signals which contain direct current function signals, comprising a pair of reciprocal unidirectional facsimile amplifiers coupled into the said line, reversing relay means controllingly connected to the said amplifiers for alternative actuation thereof, vacuum tube means responsive to the potential of an incoming portion of the said transmission line to effect changes of vacuum tube space current, a plate circuit relay controlled by the said space current to apply alternative direct potentials to an outgoing portion of the said transmission line, artificial line termination means, line relay means responsive to direct current flow in said outgoing portion of the said transmission line for operatively connecting the artificial line termination to the said incoming portion of the transmission line, slow-to-release relay means operable by coaction of said plate circuit relay and said line relay means to actuate said reversing relay means and having holding contacts thereon releasable by a further coaction of said plate circuit relay and said line relay means, and power supply means for energizing the said repeater, whereby outgoing line conductance is effective to impose incoming line artificial termination, and incoming line positive polarity is effective to impose outgoing line positive polarity, and only together are effective to initiate amplifier direction reversal, and outgoing line conductance alone is effective to maintain said direction reversal, and incoming line negative polarity is effective to impose outgoing line negative polarity, and discontinuities of relatively short duration of outgoing line current and of incoming line potential are ineffective to influence said reversing relay.

2. A repeater for insertion at an intermediate point between the east and west sections of a facsimile transmission line carrying both facsimile signals and control signals in one direction at one time and in the other direction at another time which comprises a first facsimile signal amplifier having an input coupled to the east section of said transmission line and having an output coupled to the west section of said transmission line, a second facsimile signal amplifier connected in parallel with the first said amplifier having an input coupled to the west section of said transmission line and having an output coupled to the east section of said transmission line, amplifier energizing means responsive to the application of an operating potential thereto to energize the said first amplifier for amplifying facsimile signals traveling in one direction in the said transmission line, and responsive to the removal of said operating potential to energize the second said amplifier for amplifying facsimile signals traveling in the other direction in the said transmission line, a control signal bypass circuit including facsimile signal blocking means connected between the east section of said transmission line and the west section thereof, around said amplifiers, and comprising means to terminate the east section of said transmission line in its characteristic line impedance, means responsive to a control signal from the said transmission line in the said bypass circuit to produce an operating potential, means responsive to a control signal from the said transmission line in the said bypass circuit to maintain said operating potential, means responsive to a control signal from the west section of the said transmission line in the said bypass circuit to apply a control signal to the east section of the said transmission line and a connection from the said bypass circuit to the said amplifier energizing means for applying said operating potential thereto, whereby said repeater amplifies facsimile signals traveling in easterly and in westerly directions on said transmission line according to control signals therein, and causes said control signals to appear in said west section of transmission line.

3. A facsimile transmission line repeater for use at an intermediate point in a transmission line by connection to the east and west sections of said line for alternative transmission in either direction, comprising a first amplifier for repeating transmissions in one direction, a second amplifier for repeating transmissions in the opposite direction, the said amplifiers being coupled respectively to said east and west sections of said transmission line, a power supply for the said amplifiers, reversing relay means to selectively connect said power supply to said amplifiers in the alternative, and a direct current responsive conductive network connected between the east and west sections of said transmission line responsive to direct current control signals transmitted in either direction over the said transmission line to control the said reversing relay means, the said conductive network comprising a pair of direct current relays having coils connected in series, a pair of oppositely disposed semiconducting shunts each connected across the coil of a said relay, a slow-to-release relay, a set of front contacts on said slow-to-release relay connected in series with the coil of said reversing relay, a set of front contacts on each relay of the said pair, in parallel connection with the coil of the said slow-to-release relay, a further set of front contacts on the slow-to-release relay in serially interposed connection with the said contacts of the first relay of the said pair, a further set of front contacts on the second relay of said pair, connected across the coil of the first relay of the said pair, and a power supply connected in the coil circuits of said slow-to-release and said reversing relays for relay energization.

4. The device of claim 3 wherein the said first and second amplifiers are coupled inductively to the said east and west sections respectively of said transmission line.

5. A repeater for use at an intermediate point in a facsimile transmission line having direct current control signals, which comprises a first alternating current amplifier for transmission in one direction only over the said line, a second alternating current amplifier for transmission in the other direction only over the said transmission line, the said amplifiers being permanently connected in parallel into the said transmission line, amplifier energizing means controllable to selectively actuate the said amplifiers in the alternative, and a network responsive to direct current control signals occurring in the said transmission line and having a path connected in parallel with the said amplifiers for causing said control signals to be bypassed around said amplifiers, and responsive to the said signals for controlling said amplifier energizing means, which comprises slow-to-release relaying means connected to said amplifier energizing means for energizing said first amplifier while said slow-to-release relaying means is in an operated condition and for energizing said second amplifier while in the released condition a first direct current passing and directionally sensitive relaying means in said path, connected to said slow-to-release relaying means to operate it during flow of direct current in one direction in said path, and a second direct current passing and directionally sensitive relaying means in said path connected to said slow-to-release relaying means to retain it in an operated condition during flow of direct current in the other direction in said path.

6. A bi-directional non-simultaneous transmission line repeater for facsimile signals which contain direct current function signals, comprising a pair of reciprocal unidirectional facsimile amplifiers coupled into the said line, reversing relay means controllingly connected to the said amplifiers for alternative actuation thereof, vacuum tube means responsive to the potential of an incoming portion of the said transmission line to effect changes of vacuum tube space current, a plate circuit relay controlled by the said space current to apply alternative direct potentials to an outgoing portion of the said transmission line, artificial line termination means, line relay means responsive to direct current flow in said outgoing portion of the said transmission line for operatively connecting the artificial line termination to the said incoming portion of the transmission line, slow-to-release relay means operable by coaction of said plate circuit relay and said line relay means to actuate said reversing relay means and having holding contacts thereon releasable by a further coaction of said plate circuit relay and said line relay means, and power supply means for energizing the said repeater.

7. A transmission system for facsimile communication comprising a transmission channel for conveying intelligence in two directions, said intelligence consisting of facsimile signals and control signals, a plurality of repeaters comprising a first number of facsimile signal amplifying and control signal bypassing repeaters of a first type inserted in said transmission channel in spaced sequence intermediate the ends thereof, and a second number of facsimile signal amplifying and control signal amplifying repeaters of a second type also so spaced in said transmission channel, the second said number being less than the first said number, whereby adequate performance is secured with a reduced number of repeaters of the second type.

References Cited in the file of this patent

UNITED STATES PATENTS 2,606,963 Ridings ............... Aug. 12, 1952